United States Patent [19]
Avaro et al.

[11] 3,995,098
[45] Nov. 30, 1976

[54] METHOD OF POLYMERIZING OLEFINS

[75] Inventors: Michel Avaro; Pierre Mangin, both of Martigues, France

[73] Assignee: Naphtachimie, Paris, France

[22] Filed: Mar. 18, 1974

[21] Appl. No.: 452,111

Related U.S. Application Data

[63] Continuation of Ser. No. 242,831, April 10, 1972, abandoned.

[30] Foreign Application Priority Data

Apr. 23, 1971 France .................. 71.14476

[52] U.S. Cl. .................. 526/151; 252/429 C; 526/153; 526/352; 526/904
[51] Int. Cl.² .................. C08F 4/66; C08F 10/02
[58] Field of Search .................. 252/429 C; 260/93.7, 260/88.2, 94.9 E; 526/151

[56] References Cited
UNITED STATES PATENTS

| | | | |
|---|---|---|---|
| 2,954,367 | 9/1960 | Vandenberg .................. | 260/94.9 E |
| 3,058,963 | 10/1962 | Vandenberg .................. | 260/94.9 E |
| 3,058,970 | 10/1962 | Rust et al. .................. | 260/94.9 E |
| 3,118,865 | 1/1964 | Bruce et al. .................. | 260/94.9 E |
| 3,201,192 | 8/1965 | Siggel et al. .................. | 260/94.9 E |
| 3,392,159 | 7/1968 | Schooley et al. .................. | 260/94.9 E |
| 3,461,083 | 8/1969 | Luciani et al. .................. | 260/94.9 E |

FOREIGN PATENTS OR APPLICATIONS

| | | |
|---|---|---|
| 6,806,890 | 11/1969 | Netherlands |
| 943,199 | 12/1963 | United Kingdom |
| 960,232 | 6/1964 | United Kingdom |

*Primary Examiner*—Edward J. Smith
*Attorney, Agent, or Firm*—McDougall, Hersh & Scott

[57] ABSTRACT

The method of polymerizing olefins which includes the preparation of a pre-activated compound of a transition metal of IVa, Va and VIa of the periodic table of elements, in which the transition metal is at least partially in a reduced valency state, in which the pre-activation is carried out by contacting the transition metal compound with an organomagnesium compound and then polymerizing the olefins in the presence of the pre-activated transition metal compound and an organo-aluminum compound.

16 Claims, No Drawings

METHOD OF POLYMERIZING OLEFINS

This is a continuation of application Ser. No. 242,831, filed Apr. 10, 1972, now abandoned.

The present invention relates to a method of polymerizing olefins in the presence of catalysts which are essentially formed by compounds of transition metals, which are subjected, before the polymerization operation, to a so-called pre-activation treatment by means of organo-magnesium compounds.

This method can in particular be used, at relatively low pressures, generally lower than 20 bars, in the polymerization or copolymerization of olefins having the formula $CH_2=CHR$, in which R is a hydrogen atom or an alkyl radical containing up to 8 carbon atoms. This method is of particular advantage for the polymerization or copolymerization of ethylene to form polymers having a molecular weight of more than 50,000.

In U.S. Pat. No. 3,118,865, description is made of the polymerization of olefins in a solvent and in the presence of a compound of a transition metal in its maximum valency state, such as titanium tetrachloride, and two co-catalysts formed by two different organo-metallic compounds, at least one of the compounds being a polyhalogenated derivative. These co-catalysts can comprise, for example, a dihalogenated organo-aluminum compound and an organo-magnesium compound. The two organo-metallic compounds are introduced simultaneously into the polymerization medium. Under the most favorable circumstances, this method makes it possible virtually to double the catalytic activity of the compounds of titanium used, which means that, all other conditions being equal, the introduction of a second co-catalyst results at best in a doubling in the amount of polymer produced. On the other hand, when the concentration of transition metal compound is lower than a certain value, approximately equal to 0.5 m.mole/l (mm) of polymerization solvent, this method no longer permits the polymerization of olefins at a low pressure.

The above mentioned method can also be applied to catalysts based on titanium trichloride, but the properties of the polymers produced are not satisfactory. In fact, the excessively small size of the grains of the polymer, and the insufficient apparent density of the latter, interfere with the direct use thereof in conversion machines. Moreover, the polymers produced have a molecular weight which is too high for them conveniently to be converted by injection or by extrusion, even when they are produced in the presence of chain-limiting agents, such as hydrogen.

It is an object of this invention to provide a method which imparts a high degree of activity to the catalysts used in the polymerization of olefins and which results in polymers having good characteristics and capable of being converted by injection or by extrusion. Because of the high degree of activity of the catalysts, removal of the catalytic residues contained in the polymer becomes unnecessary.

The invention therefore relates to a method of polymerizing olefins which comprises, in a first stage, pre-activating a solid compound of a transition metal of sub-groups IVa, Va and VIa of the periodic table of elements, wherein the transition metal is at least partially in a state of valency lower than the maximum, said pre-activation being effected by bringing said transition metal compound into contact with an organo-magnesium compound, then, in a second stage, polymerizing the olefins in the presence of the pre-activated transition metal compound and an organo-aluminum compound.

The transition metals of sub-groups IVa, Va and VIa of the periodic table of elements, referred to in the preceding paragraph, comprise titanium, vanadium, chromium, zirconium, niobium, hafnium, tantalum, tungsten, thorium and uranium.

The transition metal compound is preferably selected from compounds of trivalent titanium, corresponding to the formula $Ti(OR)_nX_{3-n}$, wherein R represents an alkyl radical which can contain from 2–8 carbon atoms, X represents a halogen, generally chlorine, and $n$ is an integer or fraction which can be of any value from 0 to 3. The trivalent titanium compounds are advantageously prepared by the reduction, by means of organo-metallic compounds such as organo-aluminic compounds, of compounds having the formula $Ti(OR)_nX_{4-n}$, wherein R represents an alkyl radical which can contain from 2–8 carbon atoms, X represents a halogen atom generally chlorine, and $n$ is an integer or fraction which can be of any value from 0 to 4. Thus, the tetravalent titanium compounds can be selected from titanium tetrachloride, an alkyl tetratitanate, or an alkyl chlorotitanate produced by a functional interchange reaction between the titanium tetrachloride and an alkyl tetratitanate.

The solid transition metal compound can also be selected from vanadium trihalides, such as vanadium trichloride or vanadium tribromide.

Pre-activation can be performed by means of a wide variety of organo-magnesium compounds. The latter are produced in any known manner and, in particular, in accordance with the Grignard reaction which comprises reacting magnesium in the metallic state and a monohalogenated organic derivative having the formula R-X in which R represents a hydrocarbon radical, such as an alkyl group, and X represents a halogen, generally chlorine or bromine. The Grignard reaction is most frequently performed in the presence of substantial amounts of an ether-oxide, such as ethoxyethane. The mixed organo-magnesium compounds, the formula of which is generally written conventionally in the form R—Mg—X, then comprise etherates which are dissolved in an excess of ether-oxide. These organo-magnesium compounds, which are dissolved by ether-oxide, can then be used directly in the pre-activation of the catalysts; they can also be used after they have first been freed from the ether-oxides which solvate them, for example by heating.

The organo-magnesium compounds can also be prepared directly in a non-solvated form, by reaction of the magnesium metal and a monohalogenated organic compound. This reaction is effected in a non-polar solvent, such as a liquid hydrocarbon, and in the absence of polar solvents, such as ether-oxides which are liable to dissolve the organo-magnesium compounds. The reaction can be initiated by means of catalytic amounts of iodine. The non-solvated organo-magnesium compounds, thus produced, are generally slightly soluble in the solvent in which lthey have been prepared, and they consequently occur in the form of suspensions, and can be used in that form or after having been separated from the solvent.

The catalysts can also be pre-activated by means of organo-magnesium compounds corresponding to the formula R—Mg—R', in which R and R' represent hydrocarbon groups such as alkyl radicals. These compounds, which are currently classed under the name of symmetrical organo-magnesiums, can be produced for example from organo-lithium compounds, in accordance with one of the following two reactions:

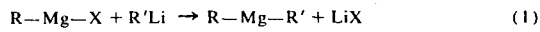    (1)

or

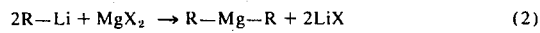    (2)

The symmetrical organo-magnesium compounds can also be prepared from mixed organo-magnesium compounds, in accordance with the reaction:

    (3)

The symmetrical organo-magnesium compounds can then be isolated, after separation of the magnesium or lithium halides formed. They generally have little solubility in non-polar solvents, except if they are solvated by ether-oxides.

Pre-activation of the transition metal compound by means of the organo-magnesium compound is preferably effected in an inert solvent, such as a saturated hydrocarbon or a mixture of saturated hydrocarbons, and at a temperature which is generally within the range of −20° to +150° C and preferably from 0° to 60° C. It is of advantage to agitate the solvent, during this operation, in order to improve the contact between the organo-magnesium compound and the transition metal compound, particularly when these compounds are both in a precipitated form. For the same reason, it is also of advantage to limit the concentration of the transition metal compound in the solvent, to values which are less than one mole per liter.

In order, by pre-activation, to obtain catalysts with a high degree of activity, and which result in polymers having satisfactory properties, it is desirable to use relative amounts of organo-magnesium compound and transition metal compound such that the atomic ratio of magnesium/transition metal is within the range of 0.1 to 10, and preferably from 0.25 to 2.

It has been found that the effect of pre-activation of the catalysts was not obtained immediately. Leaving the transition metal compound and the organo-magnesium compound in contact for a period of from thirty minutes to three hours generally results in maximum increase in the activity of the catalysts. A longer treatment, up to several days, does not substantially increase that activity, but it was found that the properties of the polymers produced after prolonged pre-activation treatment were different from the properties of polymers produced after a pre-activation treatment lasting only a few hours.

The transition metal compound is then used in the polymerization of olefins, in the presence of an organo-aluminum compound as a co-catalyst. This organo-aluminum compound corresponds to the general formula $AlR_nX_{3-n}$, wherein R represents hydrogen or an alkyl group, preferably containing from 2 to 8 carbon atoms, which alkyl group can be partially substituted by hydrogen, X represents a halogen, preferably chlorine and $n$ represents an integer or a fraction which can be of any value from 1 to 3. Such compounds are often referred to as alkyl aluminum hydrides or haloalkyl aluminum hydrides. The co-catalyst is advantageously used in amounts such that the atomic ratio:aluminum of the co-catalyst/transition metal of sub-groups IVa, Va and VIa of the catalyst, is within the range of 1 to 50.

Polymerization of the olefins is preferably carried out in a solvent, such as a saturated hydrocarbon or a mixture of saturated hydrocarbons, in which the polymer formed is in suspension or in solution. This operation is carried out under a pressure, which is generally lower than 20 bars and at a temperature within the range of 40° to 150° C. Polymerization can also be effected without any solvent, for example, the olefin can be introduced in a gaseous state in a fluidized bed constituted by the polymer being formed. During the polymerization step, it is possible to influence the mean molecular weight of the polymer formed, by means of chain-limiting agents, such as hydrogen, which is introduced in molecular proportions relative to the olefin to be polymerized, of from 10% to 80%.

Polymerization is stopped when the polymer reaches the desired mean molecular weight which is generally from 50,000 to 1,000,000. Because of the high degree of activity of the catalysts which are pre-activated in accordance with the invention, the polymers produced generally contain less than 100 and even less than 50 ppm (parts by weight per million) of transition metals. These polymers can therefore be used without it being necessary to subject them to a purification treatment.

The method of the invention should be performed with the usual precautions as regards polymerization of olefins; thus, the preparation of organo-magnesium compounds, the pre-activation treatment and the polymerization of the olefins, should be effected with protection from air and/or humidity.

EXAMPLE 1 a. Pre-activation

Ethyl-magnesium chloride is prepared by the progressive introduction, over one hour, of 71 g of ethyl chloride (1.1 mole) dissolved in 210 ml of anhydrous n-heptane in a 2 liter balloon flask placed in a nitrogen atmosphere and containing 24 g of magnesium (1 gram-atom), 100 ml of anhydrous n-heptane, an iodine crystal and 30 ml of sulphuric ether (ethoxy-ethane). After all the ethyl chloride has been introduced, the contents of the flask are maintained under agitation for 2 hours, while being heated so as to maintain a slight reflux. After cooling, the reaction medium is diluted by anhydrous n-heptane, up to a volume of 2 liters.

Pre-activation is effected by the introduction, at 20° C, into a 100 ml glass balloon flask of the following:

1 millimole (154.6 mg) of a titanium trichloride, which has previously been produced by the reduction of titanium tetrachloride by means of an organo-aluminum compound, 2 millimoles of ethyl-magnesium chloride (4 ml of the solution produced above), anhydrous n-heptane, up to a volume of 50 ml.

A number of pre-activation tests of varying duration, from ten minutes to 72 hours, are performed (see Table I).

b. Polymerization of ethylene

Polymerization is effected in a stainless steel 5-liter reaction vessel provided with a mechanical stirrer and a device for heating or cooling with a double jacket. After the reaction vessel has been inerted by means of nitrogen, the following are introduced:

2 liters of anhydrous n-heptane, 0.2 g (1 millimole) of triisobutylaluminium, the catalyst pre-activated as described in (a).

at 40° and at 60° C. The results obtained are shown in the following Table II.

TABLE II

| Test | Pre-activation period | Equilibrium pressure (bars) | I.F. 190° C 5 kg | Apparent density | Mean Grain size (microns) | Ti (ppm) |
|---|---|---|---|---|---|---|
| 2-1 | 10 min 40° C | 5.8 | 2.1 | 0.42 | >250 | 40 |
| 2-2 | 30 min 40° C | 6.2 | 1.4 | 0.40 | >250 | 40 |
| 2-3 | 1 hour 40° C | 6.8 | 1.4 | 0.41 | >250 | 40 |
| 2-4 | 10 min 60° C | 6.4 | 2.2 | 0.42 | >250 | 40 |
| 2-5 | 30 min 60° C | 6.3 | 1.2 | 0.41 | >250 | 40 |
| 2-6 | 1 hour 60° C | 6.3 | 1.4 | 0.41 | >250 | 40 |

The reaction medium is raised to a temperature of 80° C and hydrogen is introduced into the reaction vessel until the pressure is 2.5 bars, followed by ethylene at a constant flow rate of 120 g/hours. Because of this, the pressure increases in the reaction vessel until the polymerization rate reaches 120 g/hours. The pressure then takes on an equilibrium value, the measurement of which, after 1 hour of polymerization, characterizes the activity of the catalyst. The equilibrium pressure decreases as the activity of the catalyst increases.

Polymerization is stopped after 10 hours and the polymer formed is isolated, without removing the catalytic residues, in accordance with the conventional treatment by means of an alcohol.

The polymer is then subjected to measurement of the index of fluidity at 190° C under a load of 5 kg (the measurement being effected in accordance with the standard ASTM 1238-65 T), measurement of the apparent density (weight per unit of volume of the non-compressed powder), measurement of the mean grain size (by sieving), and metering the residual titanium (expressed in parts by weight per million or ppm). These results are indicated in Table I.

TABLE I

| Test | Pre-activation period | Equilibrium pressure (bars) | I.P. 190° C 5 kg | Apparent Density | Mean grain size (microns) | Ti (ppm) |
|---|---|---|---|---|---|---|
| 1-0 | 0 | Polymerization does not begin below 12 bars | | | | |
| 1-1 | 10 min | 6.6 | 1.3 | 0.42 | >250 | 40 |
| 1-2 | 30 min | 6.1 | 1.8 | 0.42 | >250 | 40 |
| 1-3 | 1 hour | 5.6 | 1.5 | 0.39 | >250 | 40 |
| 1-4 | 16 hours | 6.4 | 2 | 0.42 | >250 | 40 |
| 1-5 | 72 hours | 6.9 | 4 | 0.41 | >250 | 40 |

It will be seen from Table I, that in all the tests carried out with catalysts which had been pre-activated in accordance with the invention, the equilibrium pressure is established in about 6 bars. On the other hand, in test 1-0, the pressure rises to 12 bars without polymerization beginning. (In this reference test 1-0, the titanium trichloride, ethyl-magnesium chloride and triisobutylaluminum are introduced directly into the polymerization reaction vessel.)

EXAMPLE 2

Tests identical to tests 1-1, 1-2 and 1-3 of Example 1 are carried out, except that pre-activation is effected It will be seen from Table II that the pre-activation temperature does not have any very marked effect, either on the activity of the catalytic system or on the polymers obtained.

EXAMPLE 3

By way of comparison, tests identical to tests 1-4 and 1-5 of Example 1 are carried out, except that triisobutyl-aluminum is introduced in the pre-activation treatment at the same time as ethyl-magnesium chloride. The results obtained, as shown in Table III, show that the resulting catalysts are substantially less active than those of tests 1-4 and 1-5 and that the polymers obtained are also unusable. In fact, the polymers are found to be ungradable during measurement of the index of fluidity. (The molecular weight of the polymer is so high that the grade cannot be measured according to conventional tests.) In addition, their apparent density is clearly of insufficient value.

TABLE III

| Test | Pre-activation period | Equilibrium pressure (bars) | I.F. 190° C 5 kg | Apparent density |
|---|---|---|---|---|
| 3-1 | 16 hours | 9 | ungradable | 0.32 |
| 3-2* | 72 hours | 14 | ungradable | 0.20 |

*the polymer produced is already ungradable after 3 hours 30 minutes of polymerization.

EXAMPLE 4

Tests identical to test 1-4 are carried out, except that in test 4-1 pre-activation of TiCl$_3$ is effected with 1 mm of ethyl-magnesium chloride, whereas in test 4-2 the pre-activation step is effected with 4 mm of ethyl-magnesium chloride. The results obtained, as shown in Table IV, show that the influence of the Mg/Ti ratio affects, in particular, the index of fluidity of polymer produced.

TABLE IV

| Test | Pre-activation period | Equilibrium pressure (bars) | I.F. 190° C 5 kg | Apparent density | Mean grain size (microns) |
|---|---|---|---|---|---|
| 4–1 | 16 hours | 6 | 3.7 | 0.38 | 250 |
| 4–2 | 16 hours | 8.7 | 1.1 | 0.39 | 250 |

EXAMPLE 5

Use is made of a compound of titanium, having the mean formula $TiCl_{2.5}(OC_3H_7)_{0.5}$, produced by the reduction of the product of a functional interchange reaction between titanium tetrachloride and n-propyl-titanate, by means of an organo-aluminum compound. This compound is then pre-activated by bringing it into contact with ethyl-magnesium chloride for 1 hour, the other conditions being the same as in Example 1.

The compound which is pre-activated in this way is then used in the polymerization of ethylene, at a rate of 1 m.mole/l of titanium compound, with 2 m.mole/l of diethyl-aluminum monochloride $AlCl(C_2H_5)_2$ as a co-catalyst. The other polymerization conditions are the same as in Example 1.

The equilibrium pressure is established at 7 bars. The polymer obtained has an index of fluidity (measured at 190° C and under a load of 2.16 kg) equal to 6 and an apparent density equal to 0.40. Its residual titanium content is 100 parts per million.

EXAMPLE 6 a. Pre-activation

Operation is as in Example 1a, except that the titanium trichloride is replaced by an equivalent molecular amount of a vanadium trichloride, prepared by the reduction of vanadium tetrachloride by means of an organo-aluminum compound. The duration of the pre-activation treatment is one hour.

b. Polymerization

The pre-activated vanadium trichloride is used for polymerization as described in Example 1b, except that the polymerization temperature is 60° C. At the end of the test, 1,200 g of polyethylene is collected.

EXAMPLE 7 a. Pre-activation

A suspension of butyl-magnesium chloride, prepared in the absence of ethyl-oxide, is used. The butyl-magnesium chloride is prepared by introducing into a 5 liter reaction vessel, 102 g (1.1 mole) of butyl chloride dissolved in 210 ml of anhydrous n-heptane, 24 g (1 gram-atom) of magnesium, and an iodine crystal. The reaction vessel is closed, and its contents are heated to 70° C and maintained at that temperature for 2 hours. After cooling, the butyl-magnesium chloride suspension is diluted with anhydrous n-heptane, up to a volume of 2 liters.

Pre-activation of the titanium trichloride is then effected under the same conditions as in Example 1a, the period of treatment being 1 hour.

b. Polymerization

The pre-activated titanium trichloride is used for polymerization as described in Example 1b. The results obtained are identical to those of test 1–3.

EXAMPLE 8 a. Pre-activation

The pre-activated catalyst is prepared as in Example 5.

b. Polymerization

In a stainless steel 5-liter reaction vessel, provided with a mechanical stirrer and a device for heating, which is previously cleared by means of nitrogen, the following are introduced:

2 liters of n-heptane
28 millimoles of diethylaluminum chloride
a quantity of the pre-activated catalyst corresponding to 14 millimoles of titanium.

The reaction medium is raised to a temperature of 80° C and hydrogen is introduced into the reaction vessel until the pressure is 4 bars, followed by ethylene at a constant flow rate of 100 g/hour. After 5 hours of reaction, the polymer is filtered, extracted twice successively with 2 liters of boiling n-heptane, then extracted a third time with 2 liters of n-heptane at room temperature. Each extraction is followed by a decantation of the solvent. The polymer is afterwards dispersed in 500 milliliters of n-heptane in which 35 millimoles of trioctyl-aluminum are dissolved; the solvent is then evaporated. 450 g of a dry polymer, called "prepolymer", are obtained. This pre-polymer contains 1,490 parts per million in weight (ppm) of titanium.

26 g of said pre-polymer are introduced in a fluidized bed reactor consisting of a stainless steel tube having a diameter of 10 cm. A plate having perforations of 40 microns of mean diameter is provided at the lower part of the tube. The reactor is also equipped with a heating device. After raising the temperature inside the reactor to 105° C, the pre-polymer is fluidized by means of a gas flowing upwardly at a velocity of 10 cm/second, this gas being a mixture of 40% by volume of ethylene and of 60% by volume of hydrogen, at a pressure of 20 bars. The gas escaping from the reaction vessel is cooled in a heat exchanger located outside the reaction vessel, and recycled to the reaction vessel by means of a compressor. After 2 hours of polymerization, 1,200 g of a polyethylene are obtained. Its index of fluidity measured at 190° C under a load of 2.16 kg of 6. Its apparent density is 0.44 g/cm³. Its mean grain size is 600 microns, and it contains 32 parts per million in weight (ppm) of titanium.

In Examples 1 and 7, the anhydrous n-heptane in which the ethyl chloride (Example 1) or butyl chloride (Example 7) is dissolved may be anhydrous n-hexane in equivalent amounts.

We claim:

1. A method of polymerizing olefins having the general formula $CR_2=CHR$, in which R is a hydrogen atom or an alkyl radical containing up to 8 carbon atoms, into polymers of particulate form in suspension in the presence of (a) an organo aluminum compound and (b) a compound of a trivalent metal selected from the group consisting of titanium and vanadium in which the compound is formed by reduction with an organo aluminum compound in which the metal is in a valent state of at least 4, in which the trivalent titanium or vanadium compound is pre-activated prior to the polymerization by contact in an inert solvent for a time of at least 30 minutes, at a temperature within the range of −20° to 150° C, with an organo magnesium compound in an amount such that the atomic ratio of magnesium to titanium or vanadium is within the range of 0.1 to 10.

2. A method as claimed in claim 1 in which the solid transition metal compound is a trivalent titanium compound having the formula $Ti(OR)_nX_{3-n}$, in which R represents an alkyl radical having from 2 to 8 carbon atoms, X represents a halogen atom and $n$ is an integer or fraction of from 0 to 3.

3. A method as claimed in claim 2 in which the halogen is chlorine.

4. A method as claimed in claim 2 in which the trivalent titanium compound is formed by reduction, by means of organo-aluminum compounds, of a compound having the general formula $Ti(OR)_nX_{4-n}$, in which R represents an alkyl radical having from 2 to 8 carbon atoms, X represents a halogen atom and $n$ is an integer or fraction of from 0 to 4.

5. A method as claimed in claim 4 in which the halogen is chlorine.

6. A method as claimed in claim 1 in which the solid transition metal compound is selected from the group consisting of vanadium trichloride and vanadium tribromide.

7. A method as claimed in claim 1 in which the solvent is selected of a saturated hydrocarbon and mixtures thereof.

8. A method as claimed in claim 1 in which the temperature is within the range of 0° to 60° C.

9. A method as claimed in claim 1 in which the atomic ratio of magnesium to titanium or vanadium is within the range of 0.25 to 2.

10. A method as claimed in claim 1 in which the pre-activation treatment is carried out for a time within the range of ½ to 3 hours.

11. A method as claimed in claim 1 in which the compound (a) has the formula $AlR_nX_{3-n}$, in which R represents a group selected from the group consisting of hydrogen and alkyl group having from 2 to 8 carbon atoms, X represents a halogen and $n$ is an integer or fraction within the range of 1 to 3.

12. A method as claimed in claim 11 in which the halogen is chlorine.

13. A method as claimed in claim 1 in which the polymerization or copolymerization is carried out at a pressure below 20 bars with olefins having the formula $CH_2=CHR$, in which R is a hydrogen atom or an alkyl radical containing up to 8 carbon atoms.

14. A method as claimed in claim 1 in which the polymerization is carried out at a pressure below 20 bars in the polymerization of ethylene.

15. For use in the suspension polymerization of olefins, a catalyst, comprising (a) an organo-aluminum compound having the formula $AlR_nX_{3-n}$ in which R is selected from the group consisting of a group selected from the group consisting of hydrogen and alkyl groups having from 2 to 8 carbon atoms, X is a halogen and $n$ is a numeral of from 1 to 3, and a pre-activated catalyst component (b) formed of a compound of a trivalent metal selected from the group consisting of titanium and vanadium in which the compound is formed by reduction with an organo-aluminum compound, in which the metal is in a valent state of at least 4, in which the trivalent titanium or vanadium compound is preactivated prior to the polymerization by contact with an inert solvent for a time of at least 30 minutes, at a temperature within the range of at least −20° to 150° C, with an organo-magnesium compound in an amount such that the atomic ratio of magnesium to titanium or vanadium is within the range of 0.1 to 10.

16. A pre-activation catalyst as claimed in claim 15 in which the transition metal compound is a trivalent titanium compound having the formula $Ti(OR)_nX_{3-n}$, in which R represents an alkyl radical having from 2 to 8 carbon atoms, X represents a halogen, and $n$ is an integer or fraction of within the range of 0 to 3.

* * * * *